April 30, 1957   J. SCHWEISS   2,790,392
ELECTRIC FUEL PUMP
Filed June 16, 1952   2 Sheets-Sheet 1

INVENTOR.
JOSEPH SCHWEISS
BY
ATTORNEY

April 30, 1957 — J. SCHWEISS — 2,790,392
ELECTRIC FUEL PUMP
Filed June 16, 1952 — 2 Sheets-Sheet 2

INVENTOR.
JOSEPH SCHWEISS
BY
George R. Ericson
ATTORNEY

United States Patent Office 2,790,392
Patented Apr. 30, 1957

2,790,392

ELECTRIC FUEL PUMP

Joseph Schweiss, St. Louis, Mo., assignor, by mesne assignments, to ACF Industries, Incorporated, New York, N. Y., a corporation of New Jersey Application June 16, 1952, Serial No. 293,865

10 Claims. (Cl. 103—53)

This invention relates to reciprocating fluid pumps, and more particularly to solenoid actuated fuel pumps for automatic vehicles.

The most common type of pump in conventional use on automobiles is a diaphragm pump mounted on the engine itself and actuated by the camshaft. Pumps of this type, though relatively inexpensive, have a serious disadvantage; because of their location, necessarily at a substantial distance from the tank, they utilize a negative pressure in the fuel line from the tank to draw the fuel therethrough. Under certain conditions qantities of air accumulate in the line, so that the pump pumps air instead of fuel, resulting in stalling of the engine. It has been found possible to correct this condition by placing the pump in the tank, so that the fuel may be forced under positive pressure from the tank. Because of the difficulty of mechanically driving the pump such a great distance from the engine, it has been found desirable to power such pumps electrically. Electrical pumps for this service are usually of the rotary centrifugal type, are of relatively expensive construction, and must be mounted within the fuel tank, necessitating temporary removal of the tank from the vehicle, and substantial alterations in the tank structure.

Accordingly, it is an object of this invention to provide a relatively simple and inexpensive electric fuel pump.

It is an additional object to provide a fuel pump incorporating the advantages of conventional electric fuel pumps, which may be located without, though in the vicinity of, the fuel tank.

I achieve these and other objects and advantages by providing a relatively simple solenoid actuated pump mounted within a small integral auxiliary fuel reservoir. The auxiliary reservoir which I provide and which is integral with the pump structure is adapted to be secured to the underframing of the automobile outside of the fuel tank, so that the only modification required on the fuel tank itself is the connection of lines to the auxiliary reservoir. The pump body may be formed preferably of molded Bakelite or other dielectric, gasoline resistant material.

Figure 1:
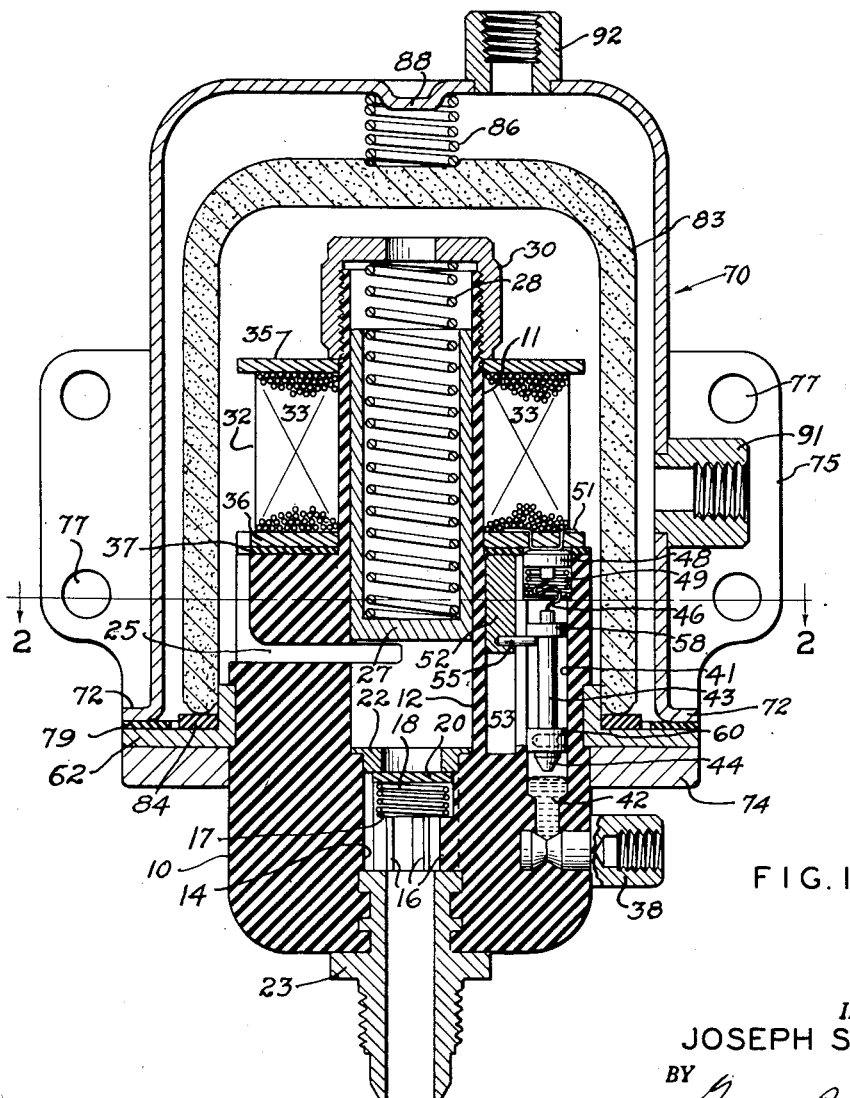
Fig. 1 is a transverse vertical sectional view of the pump and auxiliary reservoir.
Figure 2:
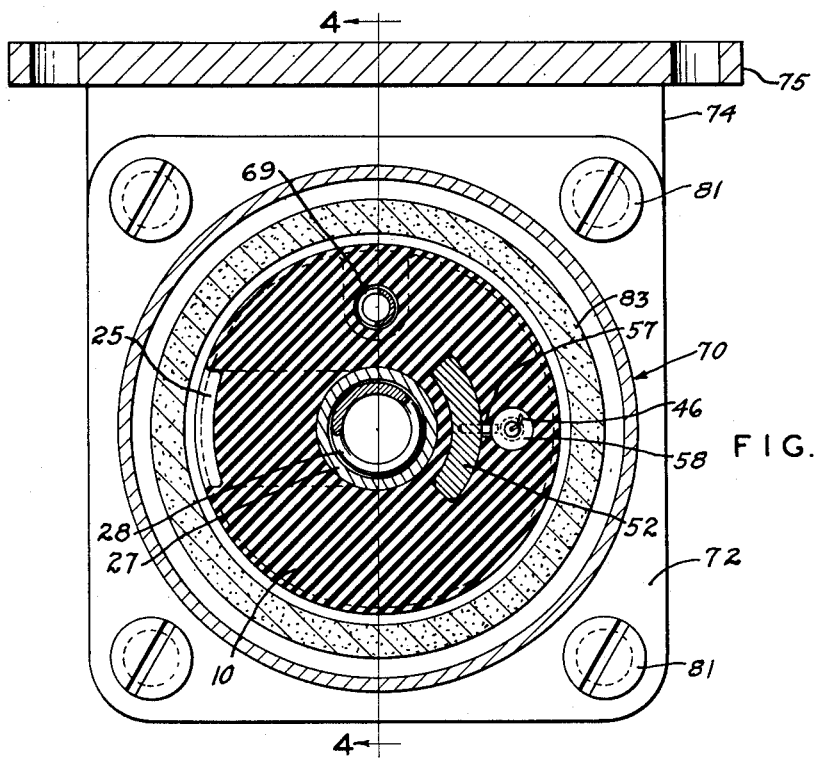
Fig. 2 is a horizontal sectional view of the pump along the line 2—2 of Fig. 1.
Figure 4:
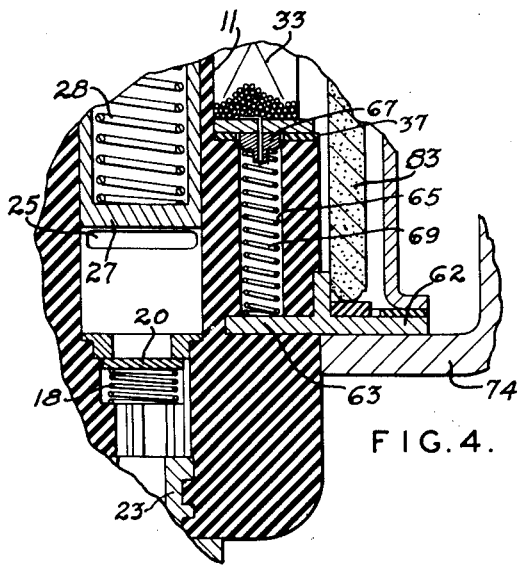
Fig. 4 is a fragmentary vertical sectional view along the line 4—4 of Fig. 2.

Referring to Fig. 1, the numeral 10 refers to a pump body molded of Bakelite, or of other material having similar dielectric and gasoline resistant properties. Body 10 is of substantially cylindrical shape and is formed with an upstanding cylindrical extension 11. Upstanding portion 11 and the upper part of body 10 are provided with an axial bore 12, to serve as the pump cylinder. At the lower end of bore 12 is formed an axially extending opening 14, which is provided with a plurality of longitudinal ribs 16, stepped as at 17 to form a seat for coil spring 18. A disk type valve 20 is retained against the upper end of spring 18 by a metal ring 22, press-fitted into the lower end of bore 12, so that when fluid pressure is applied to the top of outlet valve 20, the valve disk will be urged downwardly compressing spring 18, thereby permitting the passage of fuel around the valve disk and between ribs 16. A threaded outlet nipple 23 is molded into the lower portion of body 10, and communicates with opening 14, thereby providing an outlet from bore 12. A horizontal slot 25 is formed in body 10 for admitting fuel to central bore 12.

A piston 27 is slidably mounted for axial movement in bore 12. Piston 27 is formed of a ferro-magnetic material and is formed with a central axially extending cavity to receive coil spring 28. The upper end of spring 28 is seated against cap 30, so that spring 28 normally urges piston 27 downwardly in bore 12.

For effecting the upward stroke of the piston an electromagnet 32 of the solenoid type is provided. Solenoid 32 includes annular windings 33, upper plate 35 and lower plate 36, and surrounds upward extension 11 of the pump body, being retained thereon by cap 30.

Means is provided for intermittently closing the solenoid circuit when the pump piston 27 reaches its lowermost position in bore 12. The circuit making and breaking means comprises a screw-type terminal 38 communicating with a well in the pump body. The well consists of the lower portion of a relatively small vertical bore 41 in the pump body, and contains a small quantity of mercury 42. The actual contact means consists of a double shouldered plunger 43 slidably mounted for axial movement in recess 41. The lower end of plunger 43 is formed with a frustro-conical tip 44 for partial immersion in the mercury 42 and the upper end is provided with a short pigtail 46. Pigtail 46 is connected at its upper end with spring-loaded contact button 48 which is normally urged upwardly by a light coil spring 49. Contact button 48 is retained in abutting engagement with a U-shaped wire 51 which is mounted in the lower plate 36 of the solenoid and is connected to an end of the winding. Thus when the lower tip 44 of plunger 43 is immersed in the mercury 42 electric current will flow from terminal 38 into the solenoid winding. For actuating plunger 43 an arcuate magnet 52 is slidably mounted in arcuate slot 53. Arcuate slot 53 is concentric with bore 12, and is separated from bore 12 by a thin wall portion, so that magnet 52, due to its own magnetism and the magnetism induced in piston 27, follows upward and downward axial movements of piston 27. Magnet 52 is provided with a horizontally extending pin 55. Pin 55 extends into bore 41 through a slot 57, and is arranged so that when piston 27 approaches the upper end of its stroke, the pin will engage the upper shoulder 58 of plunger 43, thereby lifting the lower tip 44 of the plunger out of the mercury 42, thus breaking the solenoid circuit and permitting spring 28 to urge piston 27 downwardly. Lower shoulder 60 of plunger 43 is provided with a spring-loaded friction device so that the plunger will not sink into the mercury due to the effect of gravity, thereby prematurely closing the solenoid circuit. As piston 27 approaches the bottom of its stroke, pin 55 engages lower shoulder 60, thereby forcing plunger 43 and its lower tip 44 downwardly into the mercury 42 so as to close the solenoid circuit. Pump body 10 is provided with a metal annulus 62, which is molded into its peripheral wall. Annulus 62 serves a dual purpose: It acts as a flange for mounting the body in the auxiliary reservoir assembly which will be described in detail below; it is further provided with an inwardly extending tab 63 which serves as a ground for the solenoid circuit. The inner end of tab 63 forms the lower end surface of a vertical bore 65 in the pump body. A contact button 67 is secured to the lower plate 36 of the solenoid and is connected to the ground end of the solenoid winding, electrical connection between button 67 and tab 63 of annulus 62 being effected by a coil spring 69 mounted in bore 65.

It is evident that the spring contacts 48 and 69 will facilitate assembly and disassembly of the pump, and replacement of the solenoid on the pump body. Initial assembly of the pump may be effected as follows: Spring 18 and valve disk 20 are dropped into the upper portion of opening 14 and annulus 22 is pressed into the lower end of bore 12. A predetermined quantity of mercury is placed in well 41 and the circuit breaking assembly 43—52 is dropped into appropriate slots 41 and 53. Annular gasket 37 is then placed on the upper edge of the pump body, and the solenoid 32 is properly positioned with ground contact button 67 in registry with bore 65. Piston 27 and spring 28 are dropped into bore 12, and cap 30 is secured onto the threaded upper end of the upward extension 11 of the pump body thereby securing the solenoid in electrical engagement with the appropriate contacts and properly compressing spring 28.

The pump described above is preferably mounted in an auxiliary fuel reservoir generally indicated at 70. The lower edge of reservoir 70 is formed with a flange 72 for attachment to annulus 62 and mounting bracket 74. Mounting bracket 74 is provided with a central circular opening to receive pump body 10 and a vertical portion 75 having a plurality of holes 77 for mounting the bracket on the automobile underframe. When assembled pump mounting flange 62 rests on the upper surface of mounting bracket 74 and the pump body extends downwardly through the central opening in bracket 74. A gasket 79 is interposed between the flanges 72 of reservoir cover 70 and mounting flange 62. Cover 70 is retained in sealing engagement with mounting flange 62, and the entire assembly is retained on bracket 74 by bolts 81 passing through flanges 72 and 62 and bracket 74. The portion of the pump exposed within cover 70 is completely enclosed by a cup-shaped ceramic filter element 83, which is retained in sealing engagement at its lower edge with a gasket 84 by a coil spring 86 which is seated at one end in a shallow recess in the upper surface of filter element 83 and at the other end about boss 88 formed in the upper surface of reservoir cover 70. A fuel inlet nipple 91, inside-threaded, is provided on the wall of cover 70 for admitting fuel to the auxiliary reservoir. An air vent nipple 92, similarly inside-threaded is secured to the upper surface of the reservoir cover for a purpose which will be explained in greater detail below.

Figure 5:
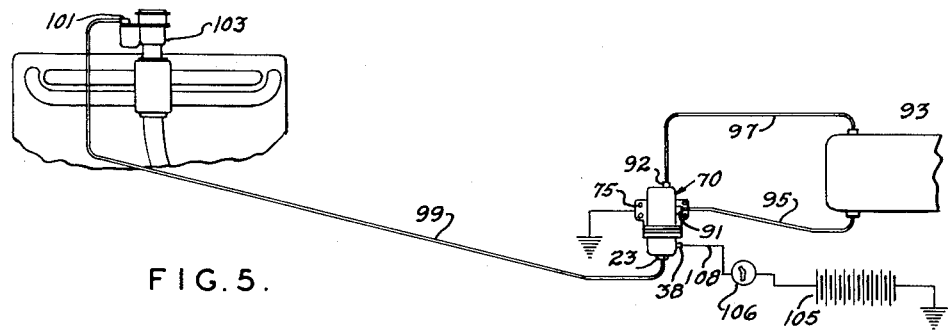
Fig. 5 is an environmental view showing the main fuel tank, connections between the main fuel tank and the auxiliary reservoir, the pump, and the connection from the pump outlet to the carburetor of an internal combustion engine.

Referring to Fig. 5, the operating relationship of the various elements comprising the fuel system is seen. A conventional automobile fuel tank is shown at 93, the bottom of which is connected to reservoir inlet nipple 91 by a short fuel line 95. Air vent nipple 92 is connected to the upper portion of the fuel tank by a line 97, the purpose of which is to vent any air bubbles which may form in auxiliary reservoir 70. The outlet nipple 23 is connected by a fuel line 99 to the fuel inlet 101 of carburetor 103. Current for powering the pump is provided by battery 105 and passes through ignition switch 106 and line 108 into screw-type terminal 38 on the pump body, the circuit being grounded through mounting flange 62 and mounting bracket 74.

Figure 3:
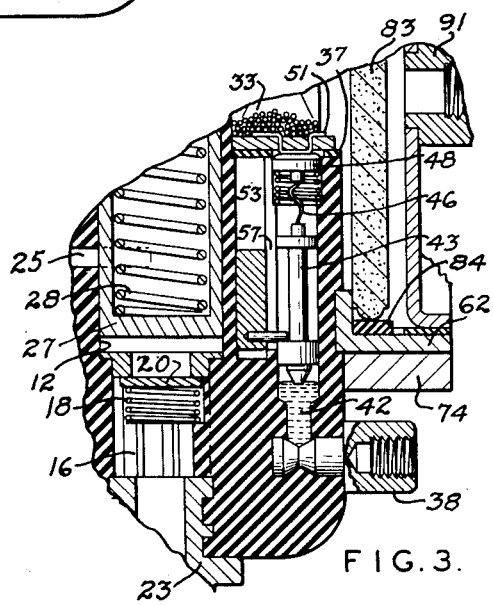
Fig. 3 is a fragmentary vertical sectional view corresponding to Fig. 1, but showing the plunger and contactor approaching their lowermost positions.

Operation of the device is as follows: When the pump circuit is closed by closing of the ignition switch 106, with plunger 43 contacting the mercury as shown in Fig. 3 the solenoid circuit is closed, thereby energizing solenoid 33. The magnetic field of solenoid 33 draws pump plunger 27 upwardly compressing spring 28, and permitting communication between fuel inlet slot 25 and pump bore 12. Fuel, fed by gravity into reservoir 70, flows by gravity through filter 83 and slot 25 into pump bore 12, any air bubbles having risen to the top of the reservoir and passed therefrom through air vent 92 and line 97. The upward movement of plunger 27 has caused a similar movement of magnet 52 which, through pin 55, withdraws plunger tip 44 from the mercury shortly after piston 27 has cleared slot 25. When this occurs the solenoid circuit is broken, with consequent de-energization of the solenoid. Thereupon coil spring 28 urges piston 27 downwardly, instantly closing inlet slot 25 and urging the fuel in bore 12 outwardly past valve 20, which it opens by compressing spring 18. The fuel thus discharged passes through line 99 and into carburetor 103. As piston 27 approaches the bottom of its discharge stroke, magnet 52 follows it downwardly to the position shown in Fig. 3, thus urging plunger 43 into the mercury 42, with consequent re-energization of the solenoid circuit. The magnetic field of solenoid 33 again elevates piston 27 as described heretofore and permits a new charge of fuel to flow into the pump through slot 25. This cycle of operation continues while the pump circuit is energized and causes a steady flow of fuel, under pressure, from the pump to the carburetor.

Although only one form of the invention has been shown and described in detail, it will be apparent to those skilled in the art that the invention is not so limited but that various changes may be made therein without departing from the spirit of the invention or the scope of the appended claims.

I claim:

1. In a reciprocating pump, a magnetic reciprocating member, electromagnetic means for actuating said magnetic reciprocating member and means for alternately energizing and de-energizing said electromagnetic means comprising a source of electrical energy, a pool of mercury connected to said source, a contact member connected to said electromagnetic means and movable into and out of said pool, a magnetic element within the magnetic field of and movable with said magnetic reciprocating member and a lost motion connection between said element and said contact member for moving said contact member into and out of said pool.

2. In a reciprocating pump having a body, a magnetic reciprocating member slidably mounted within said body, electromagnetic means for actuating said magnetic reciprocating member, and means for alternately energizing and de-energizing said electromagnetic means comprising a source of electrical energy, a recess within said body and separated from said magnetic reciprocating member, a pool of mercury in said recess, said pool being connected to said source, a contact member in said recess, said contact member being connected to said electromagnetic means and movable into and out of said pool, a magnetic element within the magnetic field of and movable with said magnetic reciprocating member and a lost motion connection between said element and said contact member for moving said contact member into and out of said pool.

3. In a reciprocating pump having a body, a cylindrical bore within said body portion, fluid inlet and outlet means communicating with said bore, a piston slidably mounted in said bore, a solenoid surrounding a portion of said cylindrical bore, a recess substantially parallel to but separated from said bore, an electrical conductor communicating with the bottom of said recess, a pool of mercury in the lower portion of said recess, a contact member with a spring pressed connection at one end to said solenoid and mounted for vertical movement in said recess, and a magnetic member movable with said piston and operatively connected to said contact member for moving said contact into and out of said mercury pool, said magnetic member being located in the portion of said recess nearest said bore, so that said piston is within the magnetic field of said magnetic member.

4. In a reciprocating pump having a body of dielectric material, a magnetic reciprocating member, electromagnetic means for actuating said magnetic reciprocating member and means within said body for alternately energizing and de-energizing said electromagnetic means comprising a source of electrical energy, a pool of mercury connected to said source, a contact member connected to said electromagnetic means and movable into and out of said pool, a magnetic element within the magnetic field of and movable with said magnetic reciprocating member and a lost motion connection between said element and said contact member for moving said contact member into and out of said pool.

5. In a reciprocating pump having a body of dielectric material, a magnetic reciprocating member slidably mounted within said body, electromagnetic means for actuating said magnetic reciprocating member, and means for alternately energizing and de-energizing said electromagnetic means comprising a source of electrical energy, a recess within said body and separated from said reciprocating member, a pool of mercury in said recess, said pool being connected to said source, a contact member in said recess, said contact member being connected to said electromagnetic means and movable into and out of said pool, and a magnetic element within the magnetic field of and movable with said magnetic reciprocating member but separated from said reciprocating member by the dielectric material of said body and including a lost motion connection between said element and said contact member whereby said contact member moves into and out of said pool responsive to movements of said reciprocating member.

6. In a reciprocating pump having a body of dielectric material, a cylindrical bore within said body, fluid inlet and outlet means communicating with said bore, a piston slidably mounted in said bore, a solenoid surrounding a portion of said bore, a recess substantially parallel to but separated from said bore, an electrical conductor communicating with the bottom of said recess, a pool of mercury in the lower portion of said recess, a contact member with a spring pressed connection at one end to said solenoid and mounted for vertical movement in said recess, and a magnetic member having said piston within its magnetic field and movable with said piston and operatively connected to said contact for moving said contact member into and out of said mercury pool, said magnetic member being separated from said cylindrical bore by a relatively thin portion of said dielectric material, thereby to prevent passage of fluid from said bore into said recess.

7. In a reciprocating pump, wall means forming a reservoir, a fluid inlet in said wall means, a pump body within said wall means, a substantially vertical bore in said body, an inlet connecting the lower portion of said reservoir with said bore a substantial distance above the lower end of said bore, an outlet valve in the lower end of said bore, a magnetic piston slidably mounted in said bore to open and close said inlet, electromagnetic means around said bore for moving said piston upwardly within said bore, a compression spring in said bore yieldably resisting upward movement of said piston, filter means substantially enclosing the electromagnetic means and the portion of said pump body within said reservoir, and electrical contact means including a pool of mercury within said body for alternately energizing and deenergizing said electromagnetic means responsive to movements of said piston.

8. In a reciprocating pump, wall means forming a reservoir, a fluid inlet in said wall means, a pump body within said wall means, a substantially vertical bore in said body, an inlet connecting the lower portion of said reservoir with said bore a substantial distance above the lower end of said bore, an outlet valve in the lower end of said bore, a magnetic piston slidably mounted in said bore to open and close said inlet, electromagnetic means around said bore for moving said piston upwardly within said bore, means within said body for alternately energizing and de-energizing said electromagnetic means responsive to movements of said piston, said electromagnetic means being enclosed by said wall means, a compression spring in said bore yieldably resisting upward movement of said piston, and electrical contact means including a pool of mercury.

9. In a reciprocating pump, wall means forming a fluid reservoir, a fluid inlet in said wall means, a pump body having its upper portion enclosed by said wall means, a substantially vertical bore in said pump body, an inlet in said body connecting the lower portion of said reservoir with said bore a substantial distance above the lower end of said bore, an outlet valve in the lower end of said bore communicating with the portion of said body outside the reservoir, a magnetic piston slidably mounted in said bore to open and close said inlet, electromagnetic means around said bore for moving said piston upwardly within said bore whereby to permit the passage of fluid into said bore from said reservoir, resilient means in said bore for urging said piston downwardly in said bore whereby to force fluid out of said bore, a cup-shaped filter substantially surrounding the electromagnetic means and the portion of said pump body within said reservoir, and electrical contact means including a pool of mercury within said body for alternately energizing and deenergizing said electromagnetic means responsive to movements of said piston.

10. In a reciprocating pump, wall means forming a reservoir, a fluid inlet in said wall means, a pump body partially enclosed by said wall means, a substantially vertical bore in said pump body, an inlet in said body connecting the lower portion of said reservoir with said bore a substantial distance above the lower end of said bore, an outlet valve in the lower end of said bore communicating with the portion of said body outside the reservoir, a piston slidably mounted in said bore to open and close said inlet, electromagnetic means for moving said piston upwardly within said bore whereby to permit the passage of fluid into said bore from said reservoir, resilient means for urging said piston downwardly in said bore whereby to force fluid out of said bore, a filter substantially surrounding the portion of said pump body within said reservoir, and means within said body for alternately energizing and deenergizing said electromagnetic means comprising a source of electrical energy, a recess within said body and separated from said piston, a pool of mercury in said recess, said pool being connected to said source, a contact member in said recess, said contact member being connected to said electromagnetic means and movable into and out of said pool, and a magnetic element movable with said piston for moving said contact member into and out of said bore.

References Cited in the file of this patent

UNITED STATES PATENTS

| 597,985 | Kapp | Jan. 25, 1898 |
| 1,598,792 | Wallace | Sept. 7, 1926 |
| 1,661,359 | Chryst | Mar. 6, 1928 |
| 1,926,074 | Warnke | Sept. 12, 1933 |
| 2,414,158 | Mock | Jan. 14, 1947 |
| 2,461,501 | Miller | Feb. 8, 1949 |
| 2,472,067 | Dickey et al. | June 7, 1949 |
| 2,576,853 | Parker | Nov. 27, 1951 |
| 2,624,491 | Bills et al. | Jan. 6, 1953 |
| 2,630,345 | Mesh | Mar. 3, 1953 |

FOREIGN PATENTS

| 202,637 | Switzerland | Apr. 17, 1939 |
| 957,859 | France | Aug. 29, 1949 |